(12) United States Patent
Sakamoto et al.

(10) Patent No.: US 10,149,266 B2
(45) Date of Patent: Dec. 4, 2018

(54) APPARATUS, METHOD, AND STORAGE MEDIUM

(71) Applicant: FUJITSU LIMITED, Kawasaki-shi, Kanagawa (JP)

(72) Inventors: Takuya Sakamoto, Kawasaki (JP); Kazuaki Nimura, Kawasaki (JP)

(73) Assignee: FUJITSU LIMITED, Kawasaki-Shi (JP)

(*) Notice: Subject to any disclaimer, the term of this patent is extended or adjusted under 35 U.S.C. 154(b) by 0 days.

(21) Appl. No.: 15/415,151

(22) Filed: Jan. 25, 2017

(65) Prior Publication Data

US 2017/0251325 A1 Aug. 31, 2017

(30) Foreign Application Priority Data

Feb. 25, 2016 (JP) .................. 2016-034642

(51) Int. Cl.
*H04B 7/00* (2006.01)
*H04W 60/06* (2009.01)
(Continued)

(52) U.S. Cl.
CPC .......... *H04W 60/06* (2013.01); *G06F 9/4411* (2013.01); *H04L 61/35* (2013.01); *H04L 67/125* (2013.01);
(Continued)

(58) Field of Classification Search
CPC ... H04L 61/6081; H04L 67/125; H04L 61/35; H04L 69/08; G06F 9/4411; H04W 4/001;
(Continued)

(56) References Cited

U.S. PATENT DOCUMENTS

2003/0084132 A1   5/2003   Ohta
2008/0256459 A1*  10/2008  Sekiya .............. G06F 21/32
                                                715/741
(Continued)

FOREIGN PATENT DOCUMENTS

JP    2003-131839      5/2003
JP    2009-536415      10/2009
WO    2007/131122 A2   11/2007

OTHER PUBLICATIONS

Pires et al., "A Platform for Integrating Physical Devices in the Internet of Things", 2014 12th IEEE International Conference on Embedded and Ubiquitous Computing, IEEE, Aug. 26, 2014, pp. 234-241, XP032688468.

(Continued)

*Primary Examiner* — Xin Jia
(74) *Attorney, Agent, or Firm* — Staas & Halsey LLP

(57) ABSTRACT

An apparatus includes a memory and a processor configured to acquire a device driver corresponding to a device, deploy the acquired device driver so as to be operable, generate an address allowing a function of the device to be called from one or more client apparatuses, register the address and a path to the device driver in association with each other, generate, based on first information in which a function to be provided by each device is described and the address, second information including the function of the device and the address, and register the second information.

20 Claims, 18 Drawing Sheets

(51) Int. Cl.
*H04L 29/06* (2006.01)
*H04W 60/04* (2009.01)
*H04L 29/08* (2006.01)
*G06F 9/4401* (2018.01)
*H04L 29/12* (2006.01)
*H04W 4/50* (2018.01)
*H04W 84/18* (2009.01)
*H04W 4/80* (2018.01)

(52) U.S. Cl.
CPC .............. *H04L 67/16* (2013.01); *H04L 69/08* (2013.01); *H04W 4/50* (2018.02); *H04W 60/04* (2013.01); *H04L 61/6081* (2013.01); *H04W 4/80* (2018.02); *H04W 84/18* (2013.01)

(58) Field of Classification Search
CPC ..... H04W 60/04; H04W 60/06; H04W 84/18; H04W 4/008
See application file for complete search history.

(56) References Cited

U.S. PATENT DOCUMENTS

| | | | |
|---|---|---|---|
| 2009/0133015 A1* | 5/2009 | Nagashima | G06F 9/4411 717/176 |
| 2013/0054744 A1 | 2/2013 | Akuzawa | |
| 2014/0047460 A1* | 2/2014 | Nagashima | G06F 9/4411 719/327 |
| 2017/0126848 A1* | 5/2017 | George | H04L 69/18 |

OTHER PUBLICATIONS

Nakajima et al., "A Virtual Overlay Network for Integrating Home Appliances", Proceedings of the 2002 Symposium on Applications and The Internet (SAINT'02), 2002 IEEE, Jan. 28, 2002, pp. 246-253, XP010587849.
"Adding an IPP Printer to Windows 7", Dec. 26, 2015, pp. 1-10, XP055381789.
Extended European Search Report dated Jun. 23, 2017 for corresponding European Patent Application No. 17152769.0, 9 pages.

* cited by examiner

FIG. 5

```
"name": "MyLED",
{
  "@type": "Property",
  "name": "rgbValueWhite",
  "outputData": "xsd:unsignedByte",
  "writable": true
}, {
  "@type": "Property",
  "name": "ledOnOff",
  "outputData": "xsd:boolean",
  "writable": true
}
```

FIG. 6

| URL | PATH (INSTANCE OF JavaScript) |
|---|---|
| http://192.168.0.10:8445/MyLED | driver["MyLED"] |

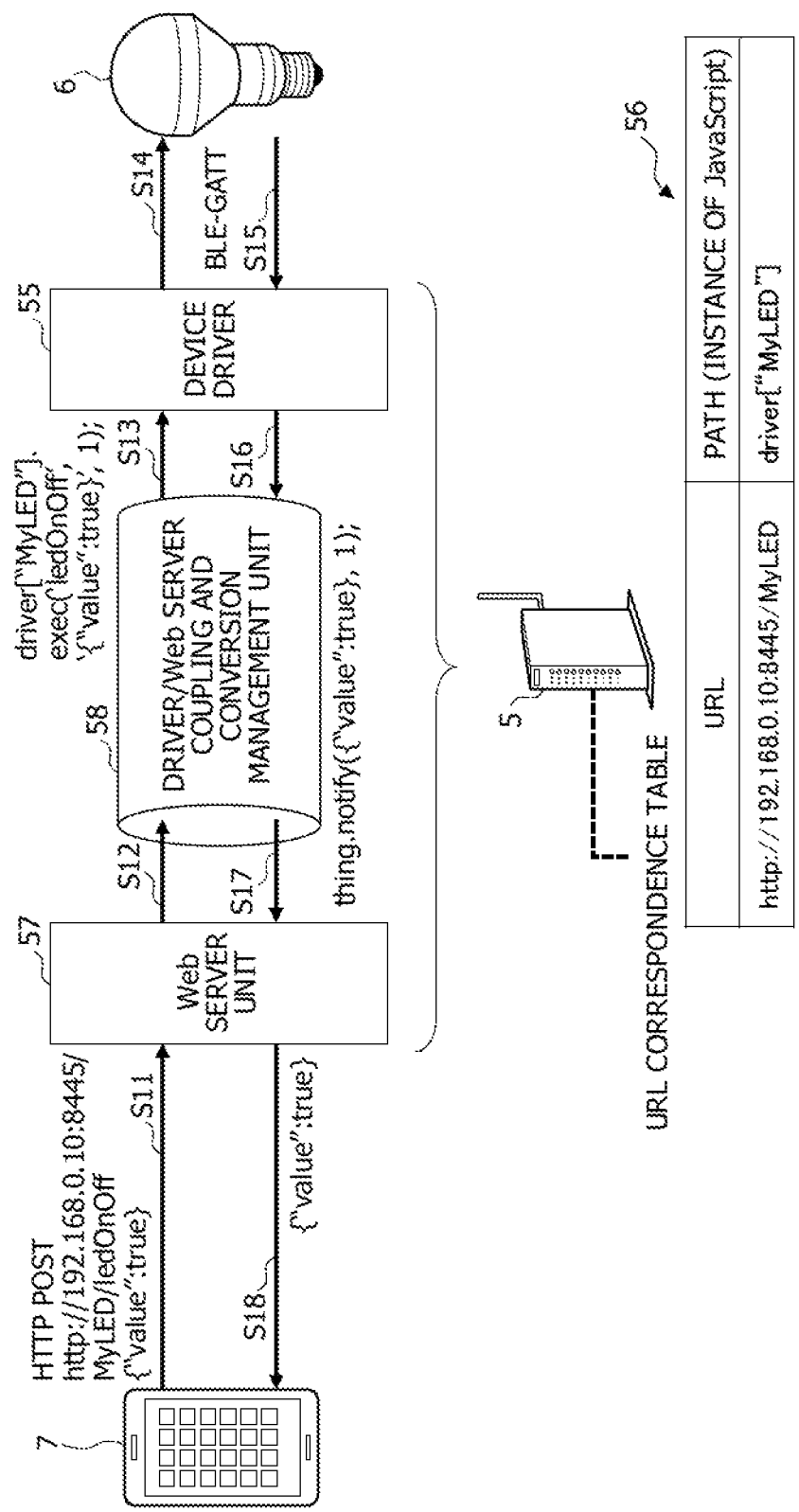

FIG. 9A

```
function getDriver() {
  getInfo: function() {
    return "¥"@type¥":¥"Property¥", ...
  }
  exec : function(action, param) {
    if (action == "ledOnOff") {
      ...
```
~ 55

FIG. 9B

```
function getDriver() {
exec : function(action, param) {
  /** @type Property
      @name ledOnOff
      @outputData xsd:boolean
      @writable true
  */
    if (action == "ledOnOff") {
      ...
```
~ 55

```
{"name": "HEALTH CARE"
 "service:"[
  {"name":"BLOOD PRESSURE SERVICE"
   "uuid": 0x1810,
   "device":[
    {"name": "SPHYGMOMANOMETER A (COMPANY A)"
     "id": 0x1111},
    ...
```

FIG. 15

```
"name": "MyLED",
{
 "@type": "Property",
 "name": "rgbValueWhite",
 "outputData": "xsd:unsignedByte",
 "writable": true,
 "default": 0
}, {
 "@type": "Property",
 "name": "ledOnOff",
 "outputData": "xsd:boolean",
 "writable": true,
 "default": false
}
```

APPARATUS, METHOD, AND STORAGE MEDIUM

CROSS-REFERENCE TO RELATED APPLICATION

This application is based upon and claims the benefit of priority of the prior Japanese Patent Application No. 2016-034642, filed on Feb. 25, 2016, the entire contents of which are incorporated herein by reference.

FIELD

The present embodiments relate to an apparatus, a method, and a storage medium.

BACKGROUND

Recently, implementation of the internet of things (IoT) wherein various devices and sensors are coupled to a network is being advanced. Although some devices have a function for directly coupling to the Internet through a mobile network, a wireless local area network (LAN) or the like, also there are devices which are coupled to and used together with a nearby smartphone or the like using a low power consumption near field wireless standard such as Bluetooth (registered trademark) or Zigbee (registered trademark). For example, among such devices as weight scales or sphygmomanometers that operate with a battery, some devices have a mechanism that enables coupling by Bluetooth only when a result of measurement is obtained thereby.

Meanwhile, a smartphone or a personal computer (PC) may be coupled to the Internet by a mobile network or wireless fidelity (Wi-Fi) to access a server using a Web technology (a communication protocol such as hypertext transfer protocol (HTTP) or WebSocket and a programming language such as hypertext markup language (HTML)/JavaScript) and use a service provided by the server. Since various services are provided using the Web technology, a very great number of engineers may handle the Web technology. Therefore, it is expected that it promotes utilization of devices that various devices may be accessed from a client such as a smartphone or a PC by the Web technology.

Therefore, an investigation of a method of coupling to a device by a Web technology called as, for example, web of things (WoT) by world wide web consortium (W3C) is being conducted. Also a gateway for performing protocol conversion such that such a device that uses Bluetooth as described above may be accessed by the Web technology is being investigated. The gateway has a function of accessing a device as occasion demands based on an access received from a client and transmitting, when information is received from the device, the information in an appropriate format to the client as occasion demands.

On the other hand, there is a technology which includes a plurality of interfaces and increases accessible devices by installing a device driver by plug and play. According to the technology, devices that may be handled from a service provided by a server change dynamically, and acquisition of a device driver suitable for a service may be facilitated. However, this technology is not a technology that gateways (protocol-converts) a Web application programming interface (API) access and is difficult to apply to WoT described above.

As an example of related art, Japanese National Publication of International Patent Application No. 2009-536415 is known.

SUMMARY

According to an aspect of the embodiments, an apparatus includes: a memory; and a processor coupled to the memory. The processor is configured to: acquire a device driver corresponding to a device, deploy the acquired device driver so as to be operable, generate an address allowing a function of the device to be called from one or more client apparatuses, register the address and a path to the device driver in association with each other, generate, based on first information in which a function to be provided by each device is described and the address, second information including the function of the device and the address, and register the second information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of provision function information;

FIG. 6 illustrates an example of a uniform resource locator (URL) correspondence table;

FIG. 8 illustrates an example of a process for a Web API call from a client;

FIGS. 9A and 9B illustrate examples in which provision function information is acquired from a device driver in a second embodiment;

FIG. 15 illustrates an example of provision function information;

DESCRIPTION OF EMBODIMENTS

In order to implement WoT described above, a gateway uses a device driver that performs protocol conversion. Since a function provided by a device driver varies depending upon with which device the device driver is to be compatible, the function is developed in accordance with the device. Therefore, where it is assumed that one gateway is placed in a room and a device is newly purchased and installed, if the user wants to have a function provided to the gateway such that also the device may be accessed, the user will perform some procedure to change the device driver in the gateway. However, such change is cumbersome to the user, and knowledge for performing such change is requested to the user. Therefore, it is not easy for anyone to perform the change readily.

It is to be noted that, although the foregoing description relates principally to a case in which a Web API access is converted into a protocol such as Bluetooth, also it may be made a target to convert a Web API access into a Web API access of a different protocol. This makes it possible to use a device through a unified Web API access.

Therefore, according to one aspect, the embodiments disclosed herein provide a mechanism for dynamically deploying a device driver in a gateway without imposing a burden on the user.

In the following, preferred embodiments are described.

First Embodiment

[Configuration]

Figure 1:
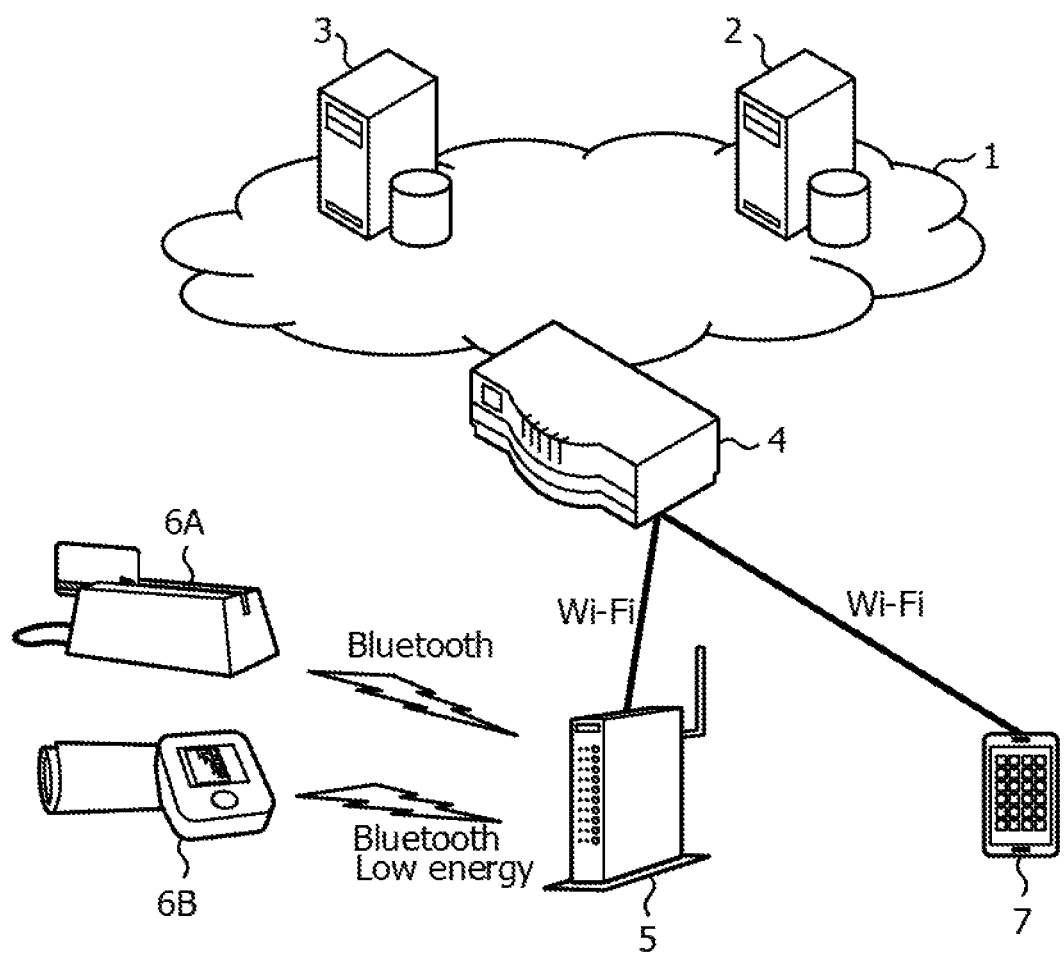
FIG. 1 depicts an example of a configuration of a system according to a first embodiment.

FIG. 1 depicts an example of a configuration of a system according to a first embodiment. Referring to FIG. 1, a driver store 2 and a device repository 3 as servers (server apparatus) are provided on a network 1 such as the Internet. The driver store 2 has stored therein device drivers that correspond to a plurality of devices 6 (6A, 6B and so forth) that may possibly be utilized and has stored therein information (provision function information) regarding functions provided by each of the devices 6 (the functions are also functions provided by a gateway 5). As the devices 6, recently, devices (peripheral devices) that are coupled in accordance with a standard later than Bluetooth 4.0 called as Bluetooth low energy (BLE) or Bluetooth Smart tend to increase also from the fact that they are compatible with smartphones such as iPhone or Android, and smart watches, health care devices for measuring the pulsation, the body temperature and so forth and liked devices are marketed. The device repository 3 has stored therein information (apparatus information) to be used to access a device 6 from a client (client terminal) 7 such as a smartphone or a PC that is used by a user to control the device 6. It is to be noted that, although description is given in the description of other embodiments hereinafter described, the device repository 3 sometimes is substantially unnecessary depending upon an access method from the client 7 to the gateway 5.

The gateway 5 includes two or more network interfaces. For example, one of the network interfaces is Wi-Fi and another one of the network interfaces is Bluetooth or the like. The gateway 5 establishes a coupling from one of the network interfaces to a server (driver store 2 or device repository 3) or the client 7 through an access point 4 to perform communication with the server or the client 7. Further, the gateway 5 establishes a coupling from another one of the network interfaces to a device 6.

It is to be noted that the driver store 2 and the device repository 3 need not be physically separate from each other, and the functions of the driver store 2 and the device repository 3 may be installed in one apparatus. Alternatively, one or both of the servers may be formed as an apparatus integrated with the gateway 5.

Figure 2:
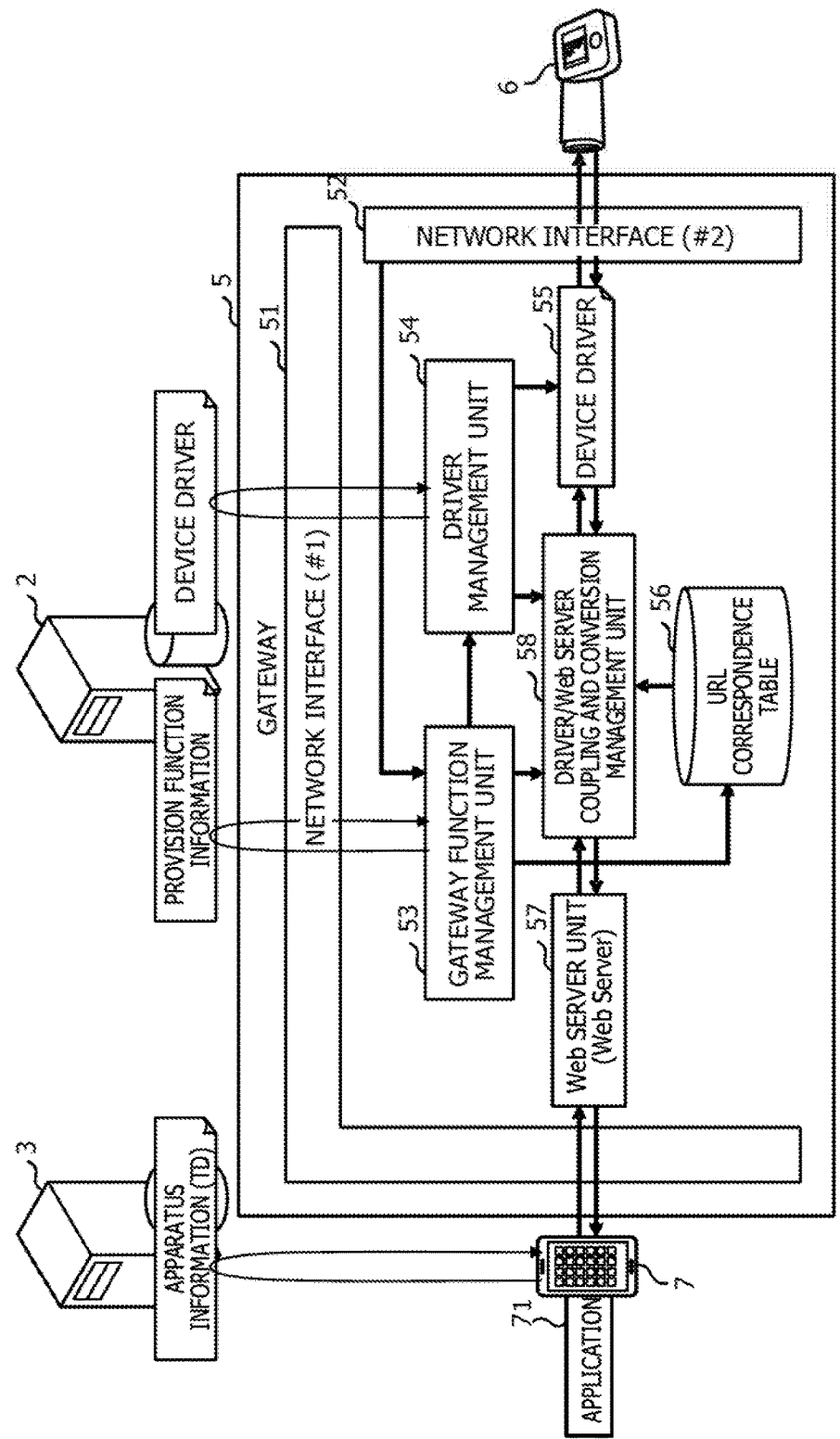
FIG. 2 depicts an example of a functional configuration around a gateway.

FIG. 2 depicts an example of a functional configuration around the gateway 5. Referring to FIG. 2, the gateway 5 includes network interfaces 51 and 52, a gateway function management unit 53, a driver management unit 54, a device driver 55, a URL correspondence table 56, a Web server unit 57, and a driver/Web server coupling and conversion management unit 58.

The network interface 51 is provided to establish a coupling to the driver store 2, the device repository 3, and the client 7 and performs communication, for example, by Wi-Fi. The network interface 52 is provided to establish a coupling to a device 6 and performs communication, for example, by Bluetooth or BLE.

The gateway function management unit 53 has a function for wholly managing the gateway 5 and performs device scan by the network interface 52, acquisition of provision function information from the driver store 2 through the network interface 51, generation of a URL that is an address for Web call, registration of the URL and a path to the device driver 55 in an associated relationship into the URL correspondence table 56, generation of apparatus information (thing description (TD)), registration of the apparatus information into the device repository 3 and so forth. The driver management unit 54 has a function of acquiring a device driver from the driver store 2 through the network interface 51 and deploying the device driver in a usable state. The device driver 55 is coupled to a device 6 through the network interface 52 and controls the device 6.

The Web server unit 57 has a function of accepting a Web call utilizing a function of a device 6 from an application program (hereinafter referred to as application) 71 of the client 7, passing the Web call to the driver/Web server coupling and conversion management unit 58, and passing a response from the device 6 side from the driver/Web server coupling and conversion management unit 58 to the application 71. The driver/Web server coupling and conversion management unit 58 has a function of referring to the URL correspondence table 56 from the URL for Web call passed thereto from the Web server unit 57 to acquire a path to the device driver 55, converting and passing the call to the device driver 55, and converting and passing a response from the device driver 55 to the Web server unit 57.

Figure 3:
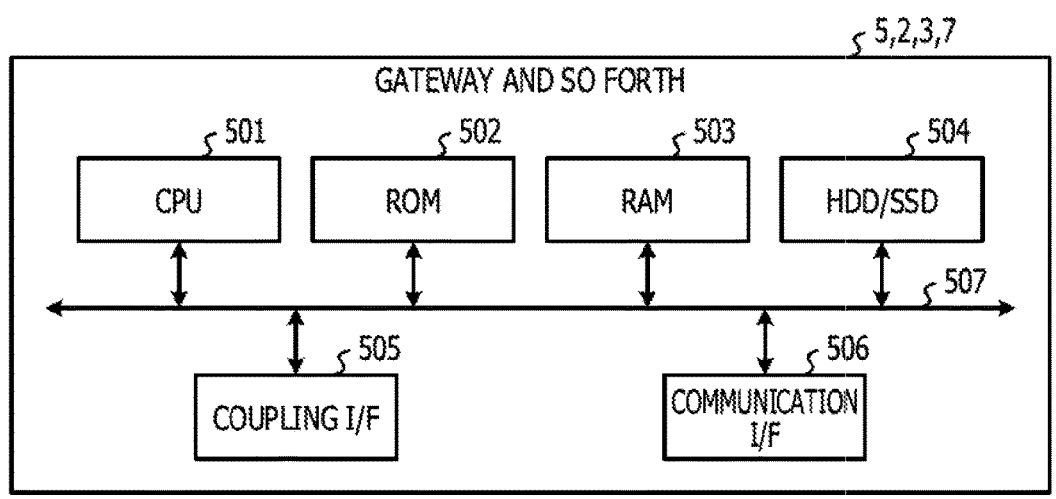
FIG. 3 depicts an example of a hardware configuration of a gateway and other components.

FIG. 3 depicts an example of a hardware configuration of the gateway 5 and so forth (also the driver store 2, the device repository 3, and the client 7 have a similar hardware configuration). Referring to FIG. 3, the gateway 5 or the like includes a central processing unit (CPU) 501, a read only memory (ROM) 502, a random access memory (RAM) 503, a hard disk drive (HDD)/solid state drive (SSD) 504, a coupling interface (I/F) 505, and a communication I/F 506. The CPU 501 comprehensively controls operation of the gateway 5 and so forth by executing a program stored in the ROM 502, the HDD/SSD 504 or the like using the RAM 503 as a work area. The coupling I/F 505 is an interface with an apparatus coupled by the gateway 5 or the like. The communication I/F 506 is an interface for performing communication with another information processing apparatus through a network. The functions of the gateway 5 and so forth described with reference to FIG. 2 are implemented by the CPU 501 executing a given program. The program may be acquired through a recording medium or may be acquired through a network, or may otherwise be incorporated in a ROM.

[Operation]

Figure 4:
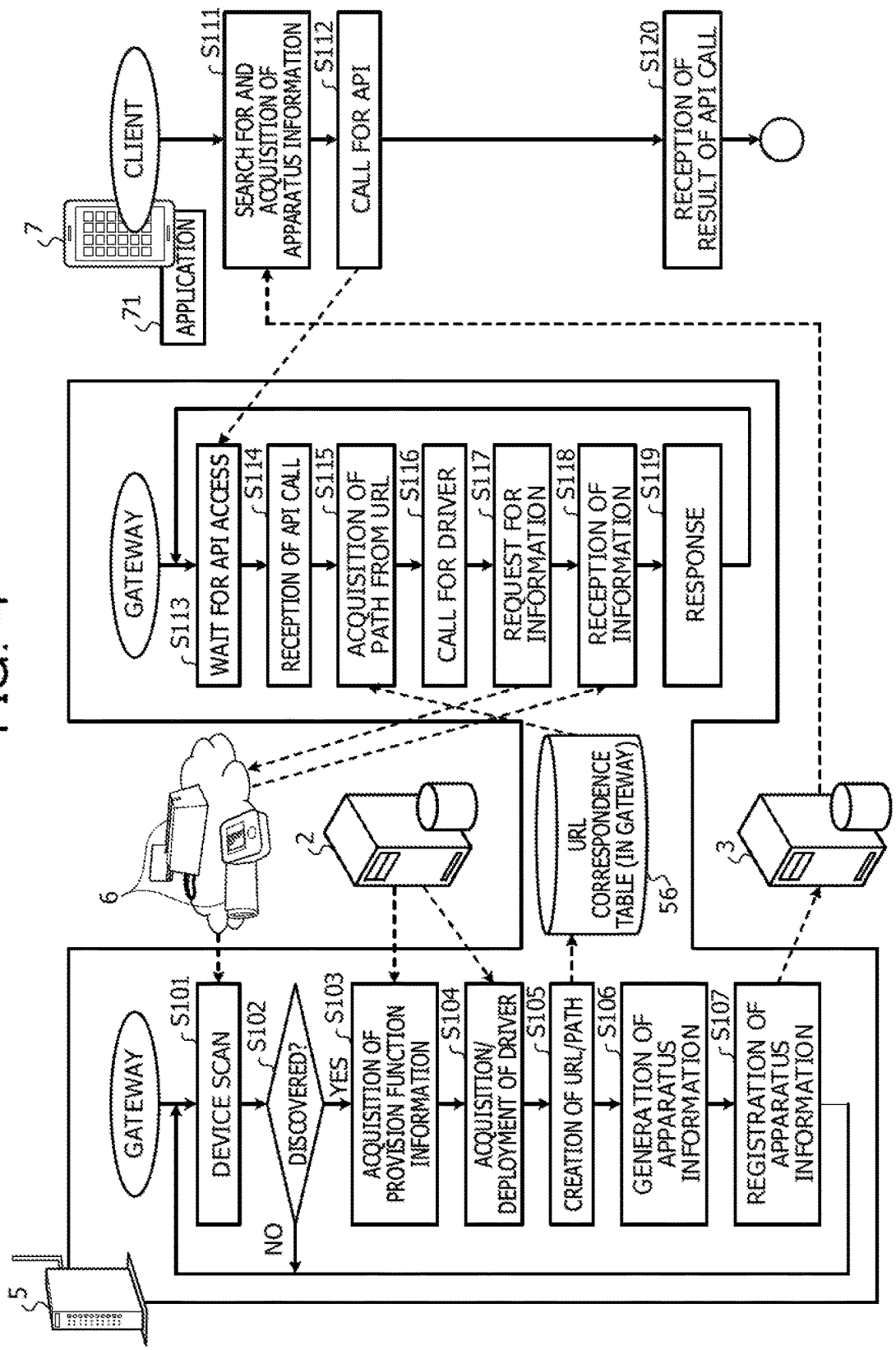
FIG. 4 is a flow chart illustrating an example of a process in the first embodiment.

FIG. 4 is a flow chart illustrating an example of a process in the first embodiment. Referring to FIG. 4, processes of the gateway 5 are roughly divided into processes for exchanging information with the server (driver store 2 and device repository 3) side and processes for exchanging information with the client 7 side. First, the processes for exchanging information with the server side are described.

The gateway function management unit 53 of the gateway 5 tries to discover a device 6 by device scan (step S101). For example, a device compatible with BLE periodically executes a process called as advertise and periodically transmits an advertising packet, and therefore, the gateway 5 may discover a device 6 by receiving the advertising packet.

Then, if a device 6 is discovered newly (Yes at step S102), the gateway function management unit 53 acquires corresponding provision function information from the driver store 2 based on information obtained from the device 6 (step S103). Since the driver store 2 provides provision function information for various device types, the gateway function management unit 53 decides which provision function information is to be acquired from within the provision function information for the various device types and acquires the decided provision function information. For the decision, in the case of a device compatible with BLE, information in the advertising packet may be used. The advertising packet includes an address and a device name allocated so as not to overlap between difference ones of the devices 6, a device vendor peculiar description part, a service universally unique identifier (UUID) and so forth. Use of the service UUID makes it possible to identify what service is provided by the device 6. The service UUID is defined by the Bluetooth special interest group and is usually used (for example, 0x1810 for a blood pressure service). However, also it is possible for a device vendor to use a peculiar value, for example, for a peculiar service to the device vendor. For example, the service UUID is transmitted to the driver store 2, and the driver store 2 responds provision function information conforming to the service UUID.

In the provision function information, what API is to be provided by a particular device 6 is described. FIG. 5 illustrates an example of the provision function information. In the example illustrated, a name of function information (name) is described as information of the entire provision function information, and as information of each API, a type of the API (@type), an API name (name), a type of data to be read in and written in (outputData), and whether it is possible to write in (writable) are described. It is to be noted that @type represents in what manner the API may be used, and Property signifies an API through which an attribute is to be read out and written.

Then, referring back to FIG. 4, the driver management unit 54 acquires (downloads) a device driver 55 from the driver store 2 (step S104). Also with regard to the device driver, a device driver suitable for the discovered device 6 is acquired from among a plurality of device drivers provided by the driver store 2. Therefore, it is possible for the driver management unit 54 to acquire a corresponding device driver by transmitting a service UUID or the like to the driver store 2 similarly to the provision function information. However, a device driver is usually provided not for each service UUID. A device driver is usually provided for each of different vendors or for each of different models even if the same service is provided by devices. Therefore, it is possible to distinguish device drivers by transmitting, in addition to the service UUID, the device vendor peculiar description part (into which, for example, a vendor identification (ID) or a model name is placed) to the driver store 2.

Then, after the device driver is downloaded, the driver management unit 54 deploys the device driver and acquires a method (path) for calling the deployed device driver 55 (step S104). As the path, for example, where the device driver is described in JavaScript (registered trademark), an instance of JavaScript may be used.

Then, the gateway function management unit 53 generates a URL for allowing the client 7 to access a Web API to be provided by the gateway. Then, the gateway function management unit 53 stores the URL and a path in an associated relationship into the URL correspondence table 56 (step S105).

FIG. 6 illustrates an example in which a URL "http://192.168.0.10:8445/MyLED" generated for a device "MyLED" of the provision function information illustrated in FIG. 5 and an instance of JavaScript of a device driver are registered as a path "driver["MyLED"]." The Web API is called by adding an API name (ledOnOff) to the URL. The URL is configured from an internet protocol (IP) address allocated to the access point 4, a port number (8445) used for listening in order to receive the Web API, and a name of function information (MyLED) acquired from the provision function information. It is to be noted that the URL may be generated by any method only if it allows an access to the Web API to be distinguished for each piece of provision function information. For example, an addition number may be generated and used as an ID (for example, for the first device, http://192.168.0.10:8445/0, for the next device, http://192.168.0.10:8445/1 or the like).

It is to be noted that, although a device driver may be written in any language, in the present embodiment, it is supposed that a device driver is described in JavaScript. As deployment, a device driver described in JavaScript is executed to create an instance of the device driver which may be accessed from JavaScript. Then, the instance is stored in an associated relationship as a path with the URL into the URL correspondence table 56. driver["MyLED"] in the URL correspondence table 56 of FIG. 6 is the instance of the device driver.

Figure 7:
FIG. 7 illustrates an example of apparatus information.

Then, referring back to FIG. 4, the gateway function management unit 53 generates apparatus information based on the generated URL (step S106). FIG. 7 illustrates an example of apparatus information corresponding to the device "MyLED" of the provision function information illustrated in FIG. 5. It is to be noted that the example of the apparatus information is based on the description format of TD investigated by Web of Things Interest Group of W3C. The apparatus information includes the created URL (part indicated by reference character a) and the provision function information (part indicated by reference character b). It becomes possible for the client 7 to access the Web API of the gateway 5 by acquiring the apparatus information.

Then, referring back to FIG. 4, the gateway function management unit 53 registers the created apparatus information into the device repository 3 (step S107). The registration into the device repository 3 may be performed using ordinary HTTP-POST or the like. It is to be noted that the apparatus information may include information of a place, information of an owner and so forth such that, when the client 7 tries to access a device 6, the client 7 may easily select a device 6 to be accessed. Such information may be set by the gateway 5 or may be acquired, where the information is of a place, automatically from global positioning system (GPS) information, or may be acquired by some other method. After the apparatus information is registered, the process is repeated beginning with device scan (step S101).

Now, a process for exchanging information with the client 7 side is described. On the client 7, an application 71 which operates in cooperation with a device 6 is operating. The application 71 is a health care application that manages a result of daily measurement in cooperation with a device 6, for example, of a medical thermometer, a weight scale, or a sphygmomanometer, a remote controller application usable as a remote controller for an electric light, a home appliance or the like, and so forth. The client 7 accesses the device repository 3 to acquire apparatus information (step S111). It is to be noted that, in order for a user, who operates the client 7, to select a device 6 to be accessed from among a plurality of registered pieces of apparatus information, preferably a method for searching for the device 6 using a name of function information, information of a place or an owner or the like is provided.

Then, after the apparatus information is acquired, the client 7 performs Web API access to the gateway 5 using the API information described in the apparatus information (step S112). For example, if the client 7 acquires the apparatus information illustrated in FIG. 7, when the client 7 uses "ledOnOff" described in the part b of the apparatus information to turn on a light-emitting diode (LED) lamp, the client 7 uses uri described in the part a to describe {value:"true"} into the body part of the URL of "http://192.168.0.10:8445/MyLED/ledOnOff" as depicted in FIG. 8 to perform HTTP-POST (step S11). It is to be noted that the protocol uses HTTP, or another protocol such as constrained application program (CoAP) or WebSocket.

Referring back to FIG. 4, the Web server unit 57 of the gateway 5 waits for Web API access (step S113), and when the Web API is called from the client 7 (step S112), the Web server unit 57 receives the Web API (step S114). The driver/Web server coupling and conversion management unit 58 to which the call received from the Web server unit 57 is passed acquires a path to the device driver 55 based on the accessing URL and the URL correspondence table 56 (step S115). Then, the driver/Web server coupling and conversion management unit 58 performs conversion based on the information received by the Web API access and calls the device driver 55 through the path (steps S116 and S117). Further, along with this, the driver/Web server coupling and conversion management unit 58 includes, in order to reply a result to the Web server unit 57, also information for identifying the Web API (Web API identification information) into the answer. Thereafter, the device driver 55 accesses the device 6, and the device 6 performs the desired operation and returns a result of the operation. When the device driver 55 receives the information (step S118), it transmits a response to the Web API call to the client 7 through the driver/Web server coupling and conversion management unit 58 and the Web server unit 57 (step S119), and the client 7 receives the response (step S120).

A process when a Web API call is received is described with reference to FIG. 8. When the substance of the call is passed to the driver/Web server coupling and conversion management unit 58 (step S12), the driver/Web server coupling and conversion management unit 58 first acquires "driver["MyLED"]," which is the instance of JavaScript, as a path from the URL correspondence table 56 based on a part of the accessing URL "http://192.168.0.10:8445/MyLED/ledOnOff" from which "ledOnOff" corresponding to the API name and a succeeding part are removed. Then, an exec function "driver["MyLED"]" has is called using the information passed as the API name and the body part of HTTP-POST and the information "1" for identifying Web API (Web API identification information) as arguments (step S13). The Web API identification information "1" is counted up and used every time the Web API is accessed. Consequently, the device driver 55 has the API name and the arguments as well as the Web API identification information, which is to be used for response, passed thereto. It is to be noted that, while, in the example described, the API name (ledOnOff) is used as it is as an argument of the exec function, for example, a table may be prepared separately such that the API name may be replaced by another argument based on the table. In order to have a table, it may be necessary to match function names of the device driver 55 and the Web API. Alternatively, before the exec function is called, it may be confirmed whether the called API is the API described as the apparatus information. With the conversion method described above, it is possible to call also an API that does not exist in the apparatus information, and an internal function of the device driver 55 which is not laid open may possibly be called. However, a fraudulent use by the client 7 may be suppressed by a check.

The device driver 55 accesses the device 6 based on the information passed thereto (step S14). In this case, since "true" is passed with respect to the property "ledOnOff," the device driver 55 performs a process for placing the LED lamp into a lit state. If the device 6 is a device compatible with BLE, and if the device 6 is not coupled, the device driver 55 first establishes a coupling to the device 6 by the GATT protocol of BLE and then performs a search for a service, read of Characteristic corresponding to the lighting function and so forth, whereafter the device driver 55 performs a process for performing write into Characteristic and so forth.

Then, the device driver 55 receives a result from the device 6 (step S15) and passes the result to the driver/Web server coupling and conversion management unit 58 (step S16). The driver/Web server coupling and conversion management unit 58 performs conversion of the format and passes a result of the conversion to the Web server unit 57 (step S17). This is performed, for example, by calling "thing.notify" that is a JavaScript API with an argument of the information passed as an argument when the device driver 55 is called. The "thing.notify" is a function for passing a value to the Web server unit 57. In order to issue, even where a plurality of Web API accesses are received, a response of a result to each corresponding Web API accesses, as information for the identification, the Web API identification information "1" given as an argument upon device driver call is added as an argument. Accordingly, in the case of the method, the Web server unit 57 stores a session established by a Web API access and Web API identification information in an associated relationship with each other in advance. It is to be noted that, since the method of dynamically replacing the device driver 55 described in JavaScript is used, the method of using Web API identification information is used. However, the method is not limited to this because only it may be required to return a response from the device driver 55 appropriately as a response to the Web API access.

The Web server unit 57 transmits a result obtained as a response to the Web API call from the corresponding client 7 (step S18). In the present example, the Web server unit 57 transmits a response {"value":true} in order to indicate that the value has been changed (lit) correctly.

By the process described above, a mechanism for automatically configuring a function for gatewaying an access from the client 7 in response to a discovered device 6 is implemented.

Second Embodiment

While the first embodiment is directed to a method of acquiring provision function information from the driver store 2, the information may otherwise be included in an acquired device driver 55. For example, the device driver 55 may be formed as a zip file such that two files (a file of the device driver and a file of provision function information) are acquired simultaneously. Further, an API for acquiring provision function information may be defined in the device driver 55, or a code of the device driver 55 may be parsed and provision function information may be created from a result of the parsing.

FIGS. 9A and 9B depict examples of acquisition of provision function information from the device driver 55 in a second embodiment. FIG. 9A illustrates an example in which a getInfo function is defined in a device driver 55 and provision function information is acquired by executing the getInfo function after the device driver 55 is deployed. FIG. 9B illustrates another example in which information of an API is written as a comment in a device driver 55 and provision function information is acquired (extracted) from the information of the API. To acquire specifications of the API from the substance written in the commented out part is used, for example, by a technology called as Javadoc of the Java language for preparing an API specification based on a comment and is implemented by a like technique.

Figure 10:
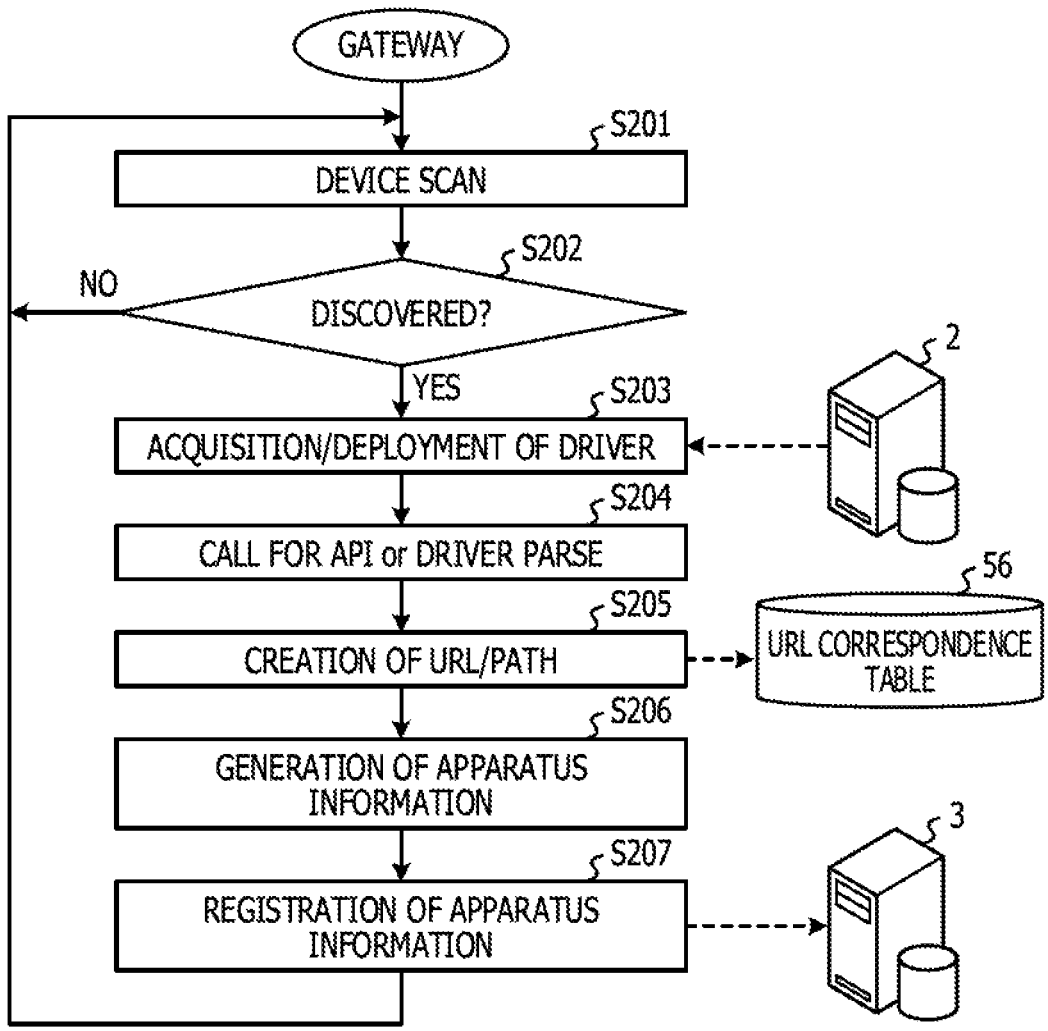
FIG. 10 is a flow chart illustrating an example of a process for exchanging information with a server side in the second embodiment.

FIG. 10 is a flow chart illustrating an example of a process for exchanging information with a server side in the second embodiment. The process includes a process for acquiring provision function information from the device driver 55 and replaces the processes at steps S101 to S107 of FIG. 4. Other processes are similar to those in FIG. 4. Also a system configuration and a functional configuration are similar to those of FIGS. 1 and 2.

The process of FIG. 10 is different from the process of FIG. 4 in that the process at step S103 of FIG. 4 is omitted while an API call or driver parse process (step S204) for acquiring provision function information is inserted after the process at step S104. Step S201 corresponds to step S101 of FIG. 4; step S202 to step S102 of FIG. 4; step S203 to step S104 of FIG. 4; step S205 to step S105 of FIG. 4; step S206 to step S106 of FIG. 4; and step S207 to step S107 of FIG. 4.

Third Embodiment

Although, in the first embodiment, acquisition of provision function information and acquisition of a device driver 55 are performed using discovery of a device 6 as a trigger, the acquisition of them is not limited to this. Here, an example in which acquisition of provision function information is performed using another trigger is described.

For example, in Bluetooth, a process called as pairing is prescribed as a pre-procedure for coupling compatible apparatus to each other. In the specifications prior to Bluetooth 4.0 also called as Classic Bluetooth, pairing may be required, but in the specifications of and later than Bluetooth 4.0 (including BLE), pairing may not be required. Pairing is a mechanism for suppressing erroneous coupling to a different apparatus and is performed by placing one of two apparatus into a pairing mode and performing scanning from the other apparatus to confirm the apparatus of the opponent, whereafter a user performs inputting of a personal identification number (PIN) or confirmation of a PIN. Acquisition of provision function information and acquisition of a device driver may be performed not upon discovery of a device but upon pairing process.

Figure 11:
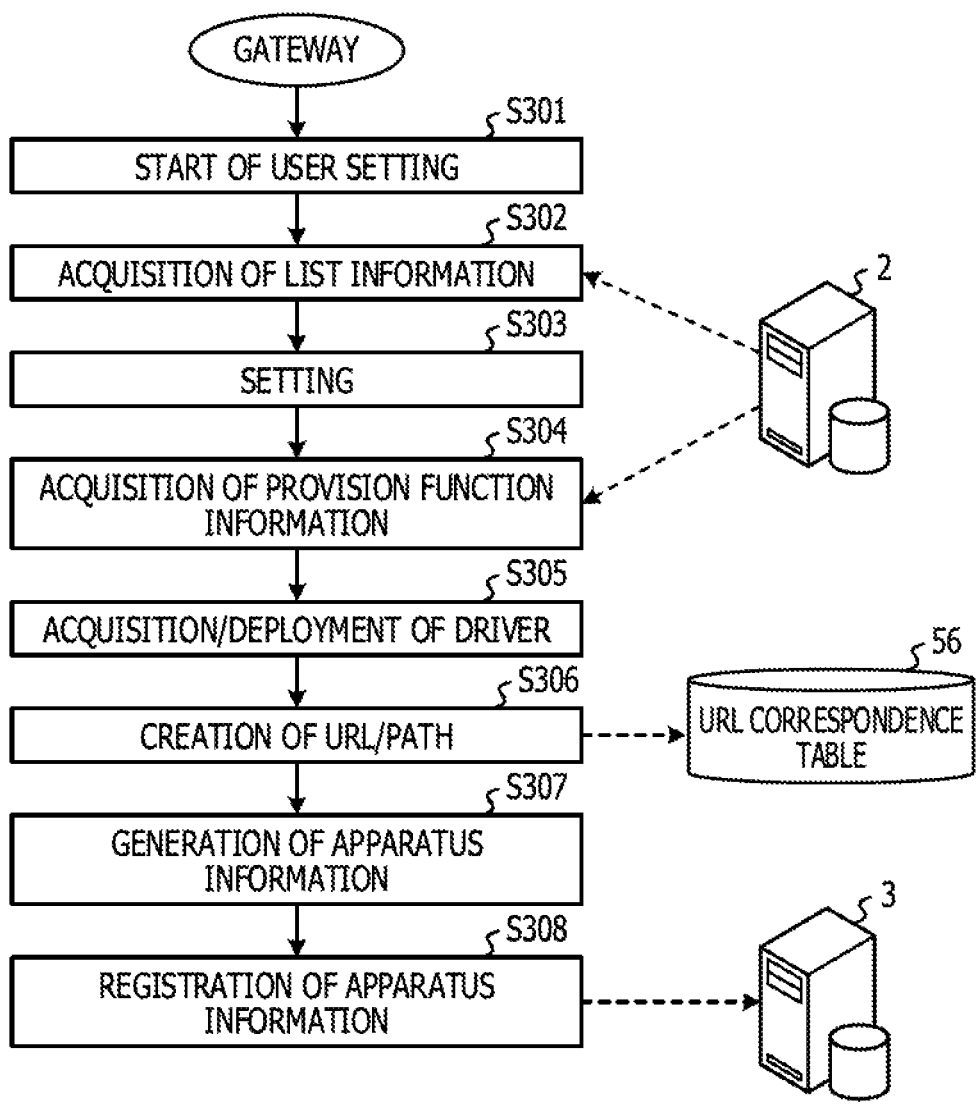
FIG. 11 is a flow chart illustrating an example of a process for exchanging information with a server side in a third embodiment.

Alternatively, acquisition of provision function information and acquisition of a device driver may be performed using setting by a user or a request from another apparatus as a trigger. FIG. 11 illustrates an example of a process for performing acquisition of provision function information and acquisition of a device driver using a user setting as a trigger and replaces the steps S101 to S107 of FIG. 4. Other processes are similar to those in FIG. 4. The system configuration is similar to that of FIG. 1. The functional configuration is similar to that of FIG. 2 except that the driver store 2 holds list information for allowing the driver store 2 to display a gateway UI and the gateway function management unit 53 has an additional function of performing acquisition of the list information to provide the gateway UI.

Figures 12A, 12B:
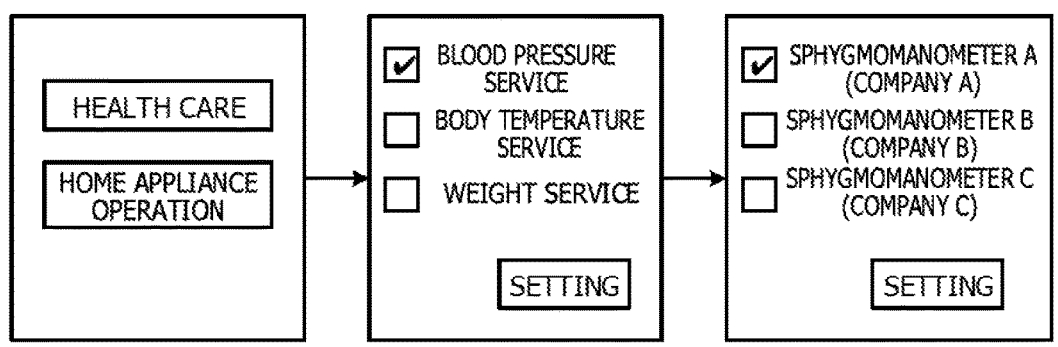
FIGS. 12A and 12B illustrate an example of list information and a gateway user interface (UI), respectively.

Referring to FIG. 11, if the gateway 5 starts user setting in response to a user operation (step S301), the gateway function management unit 53 acquires the list information from the driver store 2 (step S302). The list information includes an ID for identifying a service UUID or a device. FIG. 12A illustrates an example of the list information and indicates that a "blood pressure service" and so forth are included under the classification of "health care" and a "sphygmomanometer A (company A)" and so forth are included under the classification of "blood pressure service." It is to be noted that a classification of "home appliance operation" and so forth exist in parallel in addition to "health care."

Referring back to FIG. 11, the gateway function management unit 53 displays a gateway UI based on the acquired list information, accepts selection from a user and performs setting (step S303). FIG. 12B illustrates an example of the gateway UI and indicates that "health care" is selected from within a screen image on the left side; "blood pressure service" is selected from a screen image at the center; and "sphygmomanometer A (company A)" is selected from within a screen image on the right side.

Referring back to FIG. 11, the gateway function management unit 53 acquires provision function information corresponding to the device set by the user from the driver store 2 (step S304). Processes at the later steps S305 to S308 are similar to those at steps S104 to S107 of FIG. 4.

It is to be noted that, although a case in which a UI for setting is provided by the gateway 5 itself is described above, the gateway 5 may serve as a server such that setting may be performed for the gateway 5 from another apparatus such as a PC or a smartphone. Alternatively, simply, provision function information and a device driver designated in accordance with a request from a server may be acquired without using a UI.

Fourth Embodiment

In the first embodiment, the device repository 3 is used as a measure for acquiring apparatus information as an access method of the client 7 to the gateway 5. However, the method is not limited to this, and apparatus information may be provided by the gateway 5 similarly as in provision of a Web API by the Web server unit 57 of the gateway 5. In this case, it is significant for the client 7 to know a method for acquiring apparatus information. As a method for conveying the method, in place of registering apparatus information into the device repository 3, there are a method of registering an URL for accessing apparatus information into the device repository 3, a method of conveying a URL to an apparatus in a local network using multicast similarly as in a device discovery technology such as universal plug and play (UPnP), and a method of conveying a URL using short-range radio communication (for example, near field communication (NFC) or the like).

Figure 13:
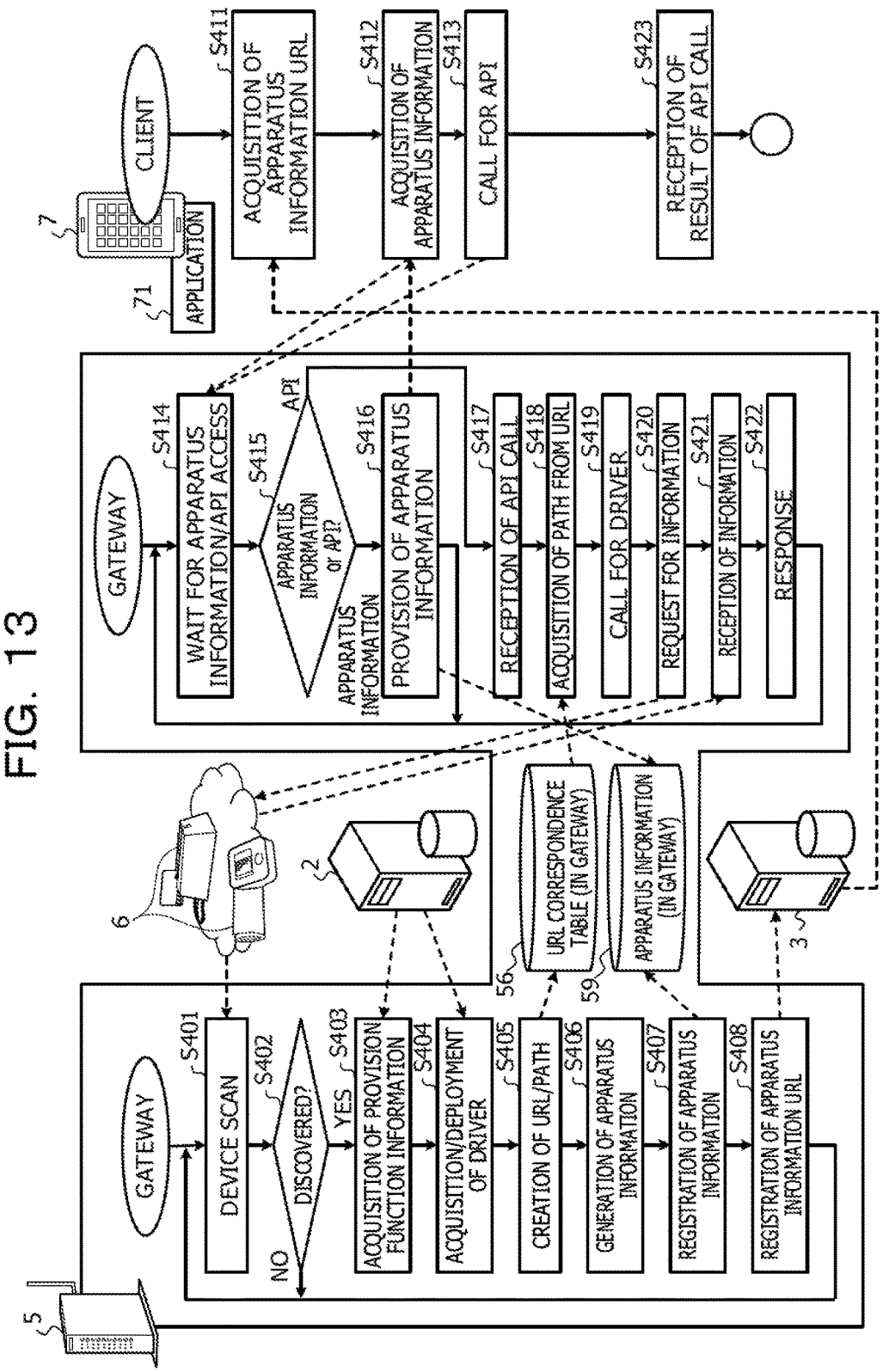
FIG. 13 is a flow chart illustrating an example of a process in a fourth embodiment.

FIG. 13 is a flow chart illustrating an example of a process in the fourth embodiment. The system configuration is similar to that of FIG. 1. The functional configuration is similar to that of FIG. 2 except that the gateway 5 holds apparatus information 59 and a function of providing apparatus information is added to the gateway function management unit 53.

The process of FIG. 13 is different from the process of FIG. 4, as regards the exchange of information with the server side, in that the destination into which apparatus information is to be registered at step S407 is the apparatus information 59 in the gateway 5 and that an apparatus information URL for accessing apparatus information is generated and registered into the device repository 3 at step S408. Further, as regards the process of the client 7 side, the process of FIG. 13 is different from the process of FIG. 4 in that an apparatus information URL is acquired from the device repository 3 at step S411 and that apparatus information is acquired from the gateway 5 based on the apparatus information URL at step S412. Further, as regards the process of the gateway 5 side, the process of FIG. 13 is different from the process of FIG. 4 in that it is decided whether the access is an access for acquisition of apparatus information or a Web API access and the process is branched based on the decision at steps S414 and S415 and that the gateway function management unit 53 provides apparatus information at step S416. Other processes are similar to those in FIG. 4.

Where multicast or short-range radio communication is used, the apparatus information URL registration by the gateway 5 at step S408 and the apparatus information URL acquisition by the client 7 at step S411 are performed using multicast or short-range radio communication in place of passing through the device repository 3.

Fifth Embodiment

Although, in the embodiments described above, the client 7 is enabled to acquire apparatus information after acquisition of a device driver 55, acquisition of apparatus information may be performed before acquisition of a device driver 55. Instead, however, since there is the possibility that the client 7 may access the device 6 before acquisition of a device driver 55, the gateway 5 issues a response in a state in which a device driver 55 is not deployed. A device 6 in which Bluetooth is installed includes, in order to implement power saving, a sphygmomanometer or the like for performing an advertisement for being discovered only within a fixed period of time (for example, for one minute) only after measurement. Since the client 7 is enabled to access apparatus information before the device 6 starts advertisement, it is possible, for example, to notify a user of the presence of a sphygmomanometer to urge the user to perform blood pressure measurement.

Figure 14:
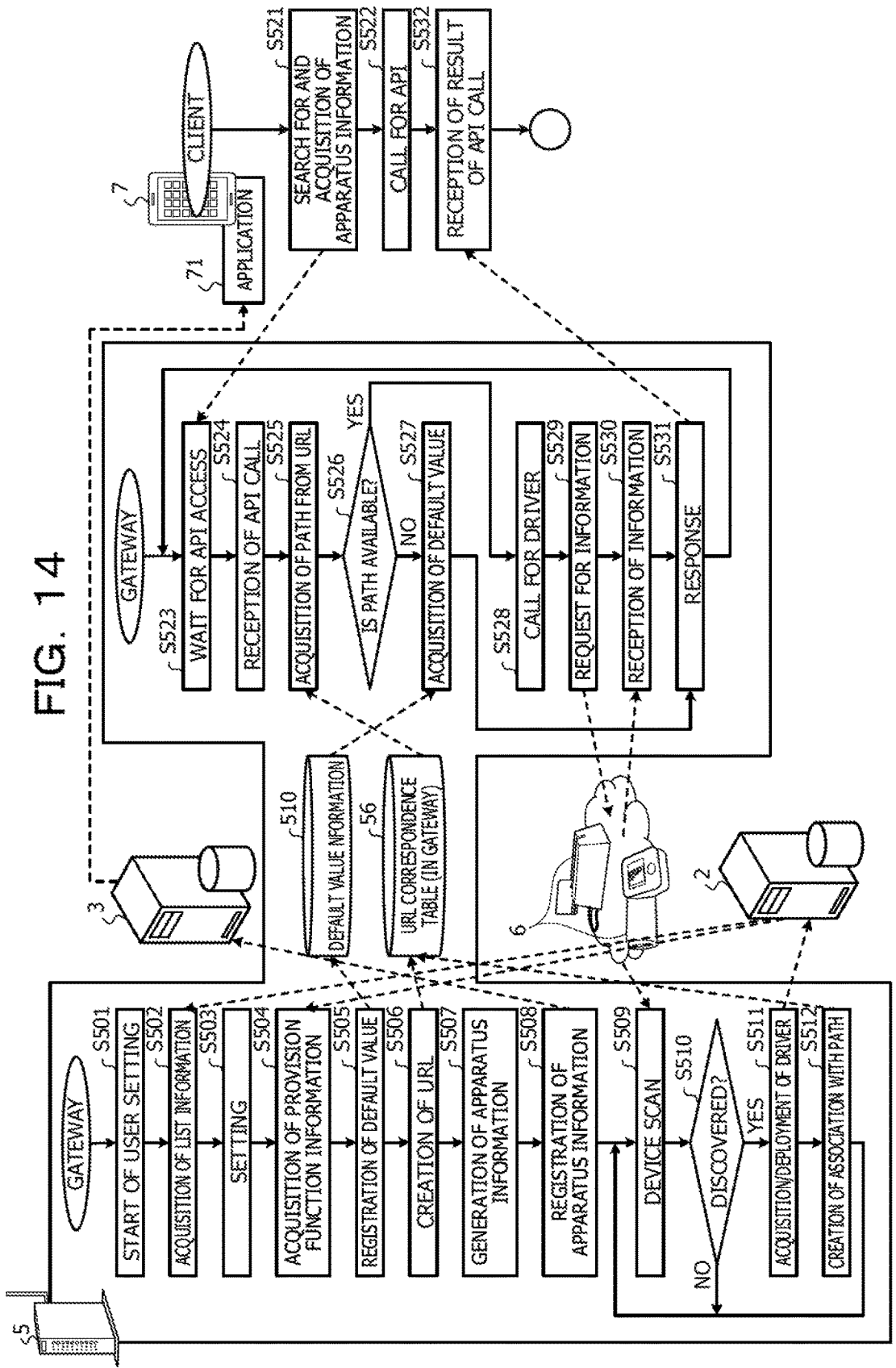
FIG. 14 is a flow chart illustrating an example of a process in a fifth embodiment.

FIG. 14 is a flow chart illustrating an example of a process in a fifth embodiment. The system configuration is similar to that of FIG. 1. The functional configuration is similar to that of FIG. 2 except that the gateway 5 retains default value information 510, that the gateway function management unit 53 registers a URL into the URL correspondence table 56 without associating the URL with a path, that a function for associating a path with a URL is added after acquisition of a device driver 55, and that a function of acquiring, when a path corresponding to a URL is not available, a default value and issuing a response using the default value is added to the Web server unit 57.

Referring to FIG. 14, processes at steps S501 to S504 are similar to those at steps S301 to S304 of the third embodiment illustrated in FIG. 11. It is to be noted that the provision function information is expanded from that in the embodiments described above in that it includes a default value. FIG. 15 illustrates an example of the expanded provision function information, which includes a default value "default." With regard to "rgbValueWhite" in the example depicted in FIG. 15, "0" is set corresponding to "outputData":"xsd:unsignedByte," and with regard to "ledOnOff," "true" is set corresponding to "outputData":"xsd:boolean."

Referring back to FIG. 14, the gateway function management unit 53 registers a default value included in the provision function information into the default value information 510 in order to use the default value when a response is to be issued later (step S505). Then, the gateway function management unit 53 creates a URL. However, since a device driver 55 is not deployed as yet and no corresponding path is available, the gateway function management unit 53 registers only the URL into the URL correspondence table 56 (step S506). Then, the gateway function management unit 53 generates apparatus information (step S507) and registers the generated apparatus information into the device repository 3 (step S508). As a result, the client 7 acquires the apparatus information from the device repository 3 and may thereafter access the Web API.

Thereafter, the gateway function management unit 53 performs device scan (step S509). If a device 6 is discovered (Yes at step S510), the gateway function management unit 53 performs acquisition and deployment of the device driver 55 (step S511) and associates a path with the URL of the URL correspondence table 56 (step S512).

On the other hand, as regards access from the client 7, the gateway function management unit 53 attempts to acquire a path from the URL (step S525) and decides whether or not there is a path (step S526). If there is no path, the gateway function management unit 53 acquires the default value from the default value information 510 (step S527) and issues a response (step S531). Except the processes at the steps mentioned, processes of the client 7 are similar to those at steps S111 to S120 of FIG. 4.

It is to be noted that, although a value provided as provision function information is used as the default value for use for response, the default value may otherwise be incorporated so as to merely return an error code without using provision function information. Whichever Web API is called like, for example, {"error":true, "description":"no connection error"}, a same response may be returned.

Sixth Embodiment

The foregoing description of the embodiments is given about processes until a device 6 is discovered and placed into a usable state. Here, a case in which a device 6 disappears is described. As a device 6 coupled by Bluetooth or the like, there is a sphygmomanometer or a like device which performs advertisement for discovery for a fixed period of time and, when some period of time passes after the device 6 is discovered and coupled, the network function is turned off in order to implement power saving. In the case of such an apparatus, a process according to decoupling is performed.

Figure 16:
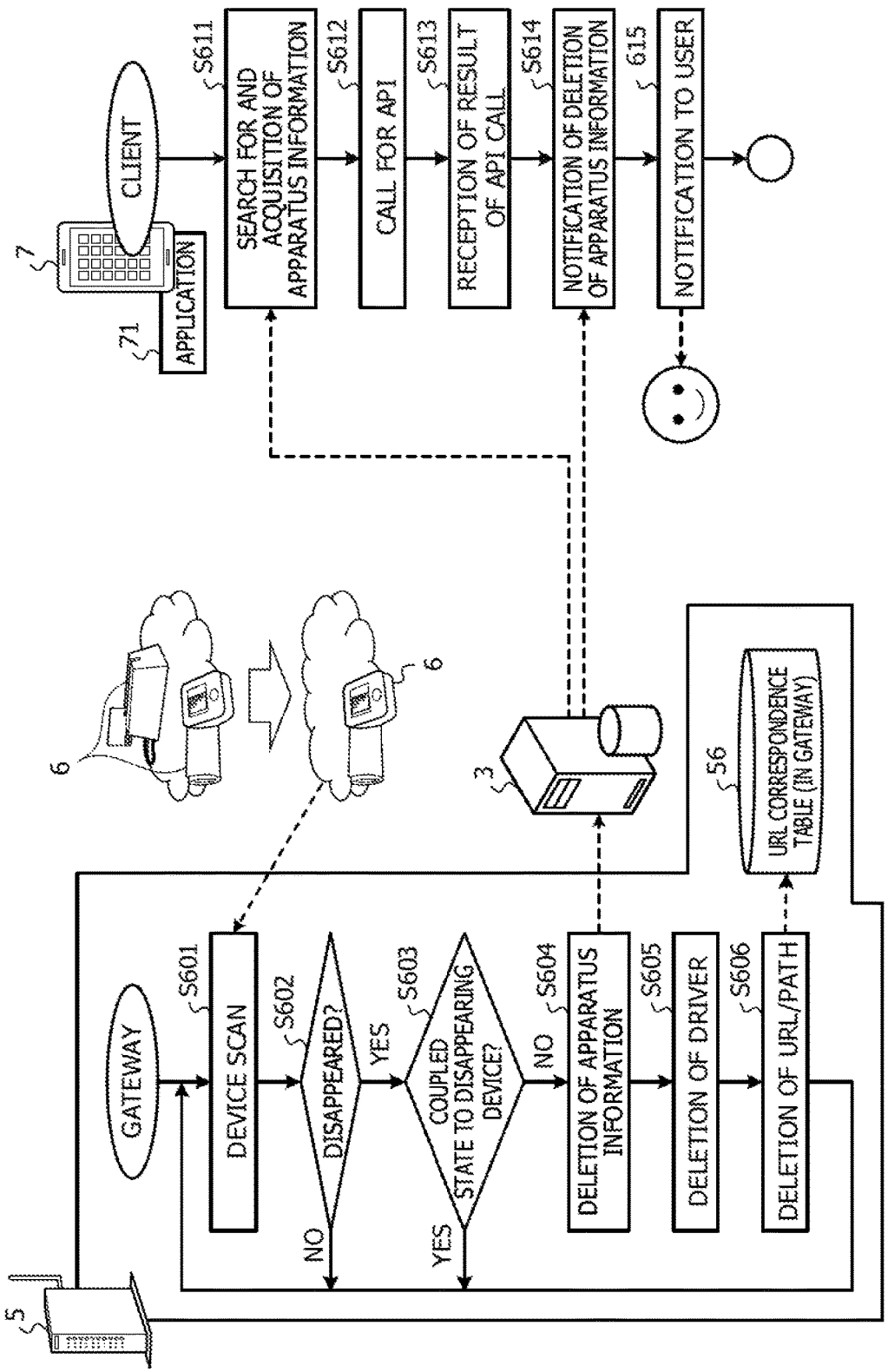
FIG. 16 is a flow chart illustrating an example of a process in a sixth embodiment.

FIG. 16 is a flow chart illustrating an example of a process in a sixth embodiment and illustrates a process when a device disappears. It is to be noted that it is assumed as a premise of the process that a device 6 is discovered by device scan and apparatus information is laid open through the device repository 3 by the mechanism of the first embodiment.

Referring to FIG. 16, the gateway function management unit 53 of the gateway 5 performs device scan in order to decide disappearance of a device 6 (step S601). Then, the gateway function management unit 53 decides whether a device 6 discovered already and having a device driver 55 deployed therein has disappeared (step S602). If the device 6 has disappeared (Yes at step S602), the gateway function management unit 53 decides whether the gateway 5 is in a coupled state to the device 6 (step S603). Since a device in many cases stops advertisement after the device is coupled, while the coupling to the device remains, it is difficult to discover disappearance of the device, even if the device scan is performed. Therefore, a check about this may be required.

Then, if the device 6 has disappeared and there is no coupling to the device 6 (No at step S603), the gateway function management unit 53 issues a deletion request for the apparatus information registered in the device repository 3 (step S604), and the device repository 3 deletes the registered apparatus information. The deletion of the registered apparatus information may be performed designating the name the apparatus information has. Alternatively, the gateway 5 or the device repository 3 may generate and manage an ID for the apparatus information such that the registered apparatus information is deleted through designation of the ID. Further, the device repository 3 notifies the client 7 in response to the deletion of the apparatus information (step S614). The client 7 notified of the name or the ID through the notification may decide to which device 6 access is disabled. If the client 7 receives the notification of the deletion of the apparatus information after the Web API call process (steps S611 to S613) till then (step S614), the client 7 notifies the user that the device 6 may not be used any more (step S615).

Then, the gateway function management unit 53 of the gateway 5 deletes, after it deletes the apparatus information from the inside of the gateway function management unit 53 itself, the device driver 55 deployed therein (step S605) and deletes the association information between the URL and the path registered in the URL correspondence table 56 (step S606). Since the association between the URL and the path disappears, even if the client 7 may access the Web API, a corresponding path is not acquired, and therefore, it may be decided that the Web API is a Web API not being provided at present. Therefore, a state in which the provision of the Web API is ended is entered. Consequently, coping with disappearance of a device 6 is implemented.

It is to be noted that timings of deployment/deletion of a device driver 55 and registration/deletion of apparatus information may be made different from each other in accordance with the method described in connection with the fifth embodiment. While, in FIG. 16, a deletion process of apparatus information is performed, if setting or deletion is performed, for example, by a change of setting of a user, setting or deletion of a device driver 55 may be performed in accordance with discovery or disappearance. For the change of the setting of the user, the method described in connection with the third embodiment may be used.

Although a UI for setting is illustrated in FIG. 12B, the deletion process of apparatus information may be performed, for example, at a timing at which the check is deleted. Then, when a device 6 disappears, deletion of apparatus information is not performed, and from between deletion of a device driver 55 and deletion of a URL/path, only deletion of a path is performed. Consequently, a state in which only a result of creation of a URL described in connection with the fifth embodiment is registered, for example, a state before acquisition of a device driver 55, is entered. Thereafter, the sixth embodiment operates similarly to the fifth embodiment.

Seventh Embodiment

In the embodiments described above, devices to be provided as Web APIs and actual devices/device drivers are provided in a 1:1 relationship and merely a function provided by a device driver 55 is provided as a Web API. However, the relationship of them is not limited to the 1:1 relationship and a function that is not be provided by a device driver 55 may be added.

Further, a case is considered in which one device 6 provides a plurality of functions, and as a result, a plurality of kinds of apparatus information are provided. This may be, for example, a case in which a wristwatch type device has both of a medical thermometer function and a pulse measurement function. In such a case, although the two functions may be demonstrated as a single device, they may be demonstrated otherwise as two devices of a medical thermometer device and a pulse measurement device to the client 7. In the first embodiment, in order to determine which provision function information is to be acquired, the service UUID of an advertising packet is utilized. Where a device 6 provides a plurality of functions, a plurality of service UUIDs are described in the advertising packet. Accordingly, the plurality of kinds of provision function information may be acquired. However, since the number of devices is one, the number of device drivers 55 is one. Accordingly, although two URLs are to be created in accordance with the number of kinds of provision function information, since the number of device drivers 55 with which they are to be associated is one, the Web APIs corresponding to the functions have URLs different from each other, which, however, are called using the same path. Accordingly, the same information is placed in the paths of the URL correspondence table 56.

It is to be noted that otherwise an application for controlling a device driver 55 may be deployed additionally in order to combine a plurality of devices 6 to demonstrate mashed up functions with a single Web API or to add a function difficult to be provided by a device driver 55. To mash up is to change, for example, when an alarm is to be provided as a Web API, which one of existing devices is to be used for notification (a clock device, a music player, an automatic curtain opening-closing mechanism, a combination of them or the like). Although the gateway 5 may provide a Web API to each of the devices 6 while they are mashed up by the client 7 side, by getting the devices 6 together on the gateway 5 side, if the client 7 does not control the devices 6 one by one at points of time set for alarming but the points of time are set in advance to the gateway 5 side, the client 7 need not access at each of the points of time set for alarming. Further, as described hereinabove, in order to implement power saving, some devices do not normally provide a network function. If cache information to such devices is accumulated in an application, the client 7 may access information of the devices anytime. A process in this case is described below.

Figure 17:
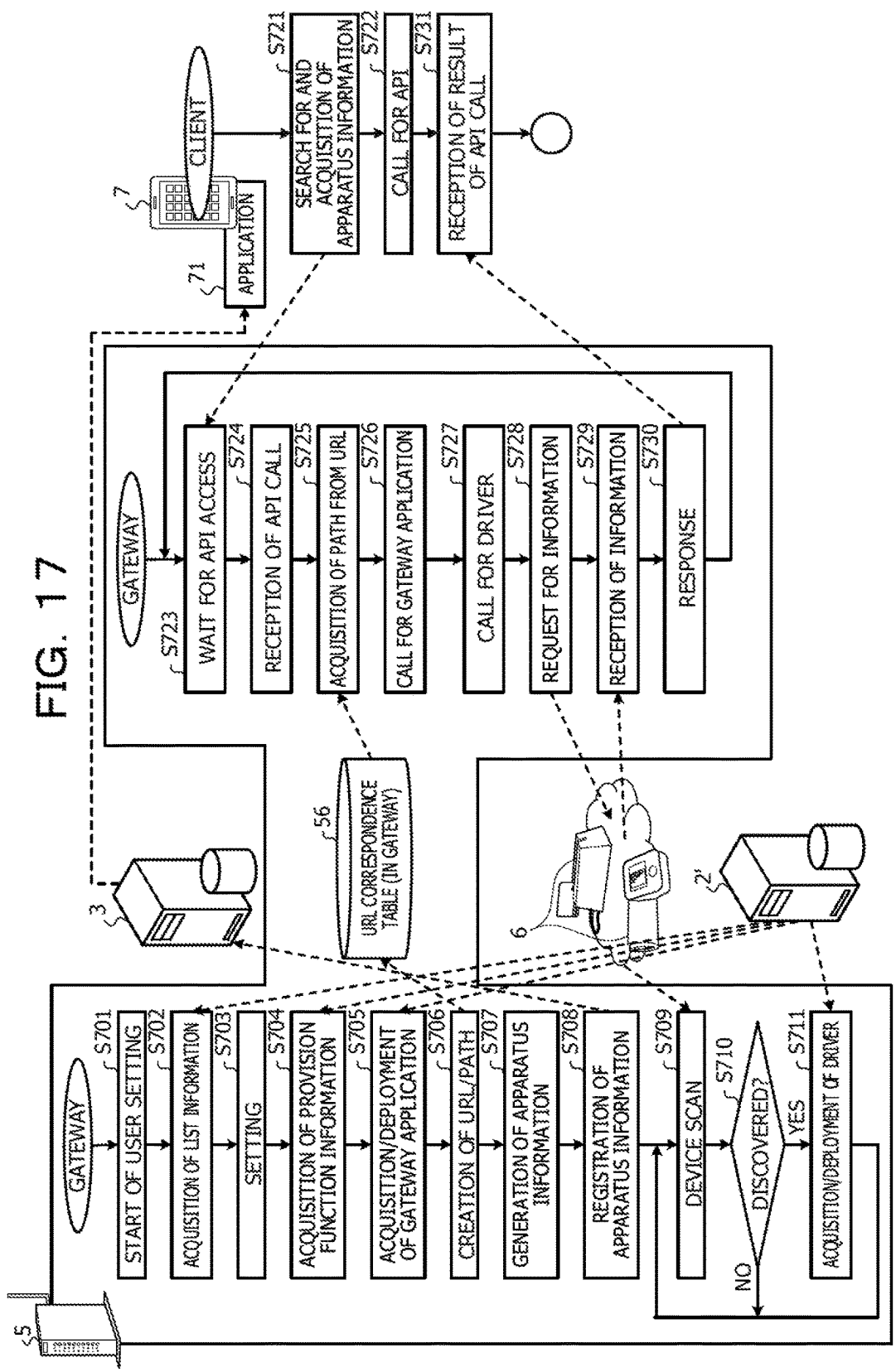
FIG. 17 is a flow chart illustrating an example of a process in a seventh embodiment.

FIG. 17 is a flow chart illustrating an example of a process in a seventh embodiment. In the present example, acquisition of provision function information is based on that performed by user setting similarly as in the fifth embodiment. Further, in the present embodiment, the driver store 2 is expanded to a gateway application/driver store 2' such that also a gateway application is provided. Further, the driver management unit 54 (or gateway function management unit 53) of the gateway 5 is expanded such that it performs acquisition and deployment of a gateway application.

In FIG. 17, processes till acquisition of provision function information (steps S701 to S704) are similar to those in the fifth embodiment. Thus, the driver management unit 54 acquires and deploys a gateway application together with acquisition of provision function information (step S705). While a device driver is associated with a certain unique device, a gateway application is not associated with a unique device and accesses a device through a device driver. Meanwhile, similarly to a device driver, a gateway application may be called in response to a Web API access from the client 7 in cooperation with the Web server unit 57.

After the gateway application is deployed, the gateway function management unit 53 creates a URL corresponding to the provision function information and registers the URL in an associated relationship with a path for calling the deployed gateway application into the URL correspondence table 56 (step S706). Then, the gateway function management unit 53 generates apparatus information corresponding to the provision function information (step S707) and registers the provision function information into the device repository 3 (step S708). Then, the gateway function management unit 53 performs device scan (step S709), and if a device 6 is discovered (Yes at step S710), the gateway function management unit 53 acquires and deploys a device driver 55 (step S711). Further, in response to the discovery of the device 6 and deployment of the device driver 55, the gateway function management unit 53 conveys a path for calling the device driver 55 to the gateway application. Consequently, the gateway application is enabled to call the device driver 55.

Then, the client 7 acquires apparatus information from the device repository 3 (step S721) and performs API call (step S722). Thus, when the Web server unit 57 of the gateway 5 receives access to the Web API from the client 7 (steps S723 and S724), it acquires a path from the URL correspondence table 56 (step S725). The acquired path is not a path to the device driver 55 but a path to the gateway application, and the gateway application is called through the path (step S726). The conversion method when the gateway application is called is same as the conversion method when the device driver 55 is called in the embodiments described hereinabove. The gateway application accesses, as occasion demands, the device driver 55 in response to the call (step S727). The device driver 55 accesses the device 6 (steps S728 and S729) and returns a response from the device 6 to the gateway application. The gateway application returns a response to the Web API call, and the Web server unit 57 returns a response to the client 7 (step S730). The client 7 receives a result of the API call (step S731). For example, if a cache function is incorporated in the gateway application, when a device 6 is not discovered, alternatively, when a device driver 55 is not deployed and no path to the device driver 55 is available, the gateway application returns a value acquired previously without accessing the device driver 55. After a device is discovered, the gateway application acquires information from the device 6 through the device driver 55 and stores the acquired information.

Eighth Embodiment

It is possible to provide a Web API after a difference between devices is absorbed through a device driver. However, a client sometimes wants to use a function unique to a device. One of methods is a method 1 that prepares also Web APIs for functions unique to all devices in apparatus information. Where a device that does not have the function is used, the device returns, to a Web API access to the function, for example, an error. This may be implemented by the embodiments described above. Another method is a method 2 that is handled as another device. In the device repository, pieces of apparatus information are each registered as different devices. The client may access each unique function as another device and may utilize the respective unique function. A further method is a method 3 that handles each unique function as the same device but updates, when the discovered device has a unique function different from a function of the device discovered previously, the apparatus information. The methods 1 and 2 may be implemented by the embodiments described hereinabove, and therefore, the method 3 is described below.

Figure 18:
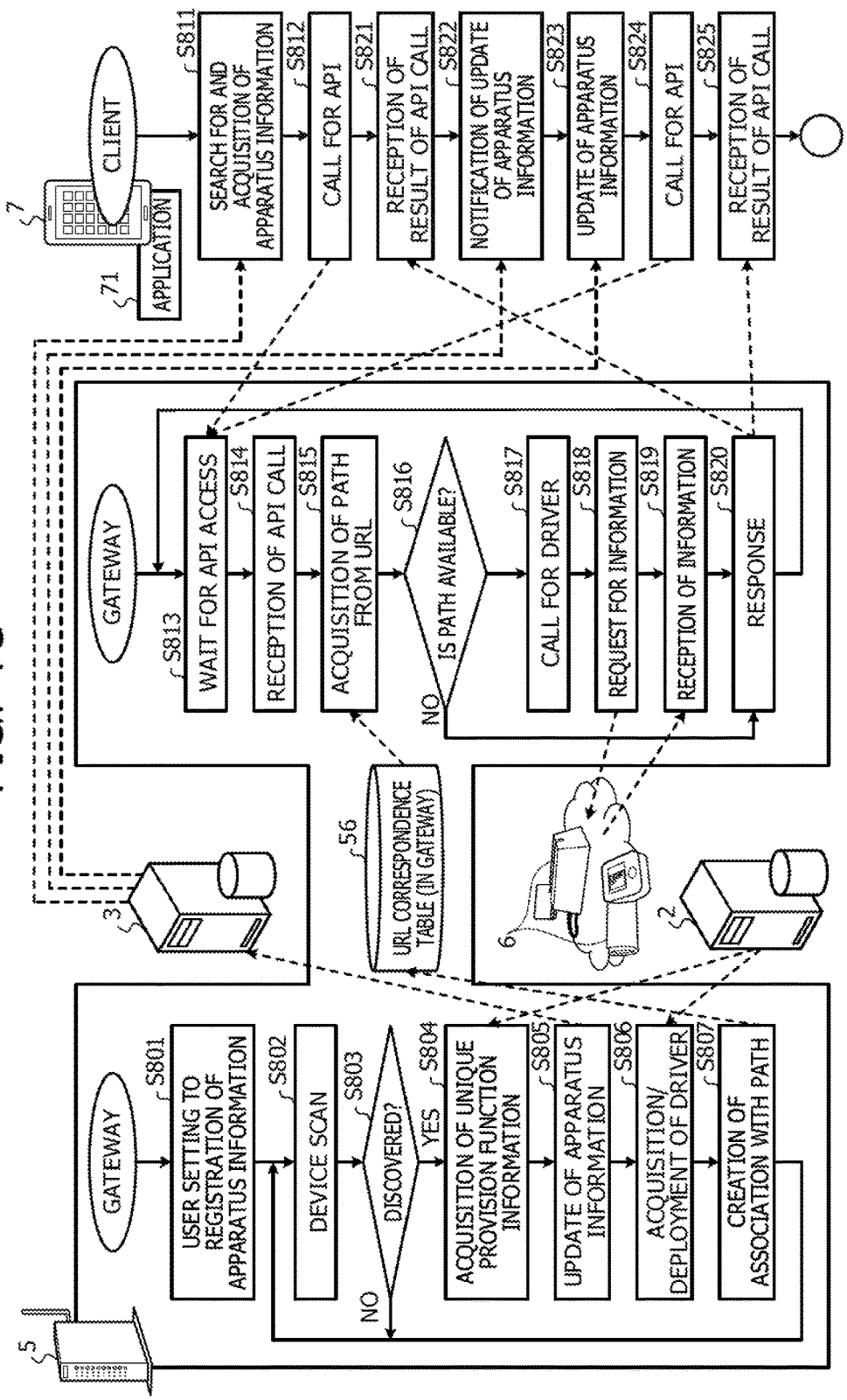
FIG. 18 is a flow chart illustrating an example of a process in an eighth embodiment.

FIG. 18 is a flow chart illustrating an example of a process in an eighth embodiment. In FIG. 18, processes till first registration of apparatus information (step S801) may be similar to those in the fifth embodiment. Then, the gateway function management unit 53 performs device scan (step S802), and, if a device 6 is discovered (Yes at step S803), the gateway function management unit 53 acquires unique provision function information from the driver store 2 (step S804). The unique provision function information may have a format same as that of the provision function information.

Then, the gateway function management unit 53 updates the apparatus information by adding the API information for the unique provision function to the apparatus information created already and performs update also of the apparatus information in the device repository 3 (step S805). The device repository 3 notifies, in response to the update of the apparatus information, the client 7, and the client 7 receives the notification (step S822). The processes described may be similar to those of operation upon disappearance of a device of the sixth embodiment except whether they are for updating or for deletion.

Then, the gateway function management unit 53 acquires and deploys a device driver 55 (step S806) and updates the URL correspondence table 56 with a path to the new device driver 55 (step S807). Consequently, the client 7 is enabled to access the function unique to the device through the Web API. It is to be noted that the processes of the gateway 5 for an API access (steps S813 to S820) are similar to those of the fifth embodiment (acquisition of a default value is omitted), and the client 7 first acquires apparatus information and performs API call and then receives a result (steps S811, S812, and S821). When an update notification of the apparatus information is received (step S822), the client 7 updates the apparatus information (step S823), performs API call based on the updated apparatus information (step S824), and receives a result (step S825). It is to be noted here that, although a case is described in which both of a common function and a unique function are described in one type of apparatus information and the functions are handled as a single device from the client 7, the common function and the unique function may be handled as different devices from each other so as to provide two different pieces of apparatus information.

<Summary>

As described above, with the present embodiments, a device driver in a gateway is deployed dynamically without imposing a burden on a user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a memory; and
   a processor coupled to the memory and configured to:
   acquire, when detecting a device by an operation, first information in which a function to be provided by the device is described and a device driver corresponding to the device,
   deploy the acquired device driver so as to be operable,
   generate an address which is used to call the function of the device from one or more client apparatuses,
   register the address and a path corresponding to a method to call the device driver in association with each other in correspondence information,
   generate second information which is used when the one or more client apparatuses access the device and includes the first information and the address,
   register the second information in a first server,
   acquire, when a first client apparatus among the one or more client apparatuses acquires the second information corresponding to a target function which is desired by the first client apparatus by accessing the first server and accesses a target address of the second information corresponding to the target function, a target path corresponding to the target function from the correspondence information based on the target address,
   call a target device driver corresponding to the target function using the target path, and
   transmit, after the target device driver accesses the target device, a response from the target device to the first client apparatus.

2. The apparatus according to claim 1, wherein the processor is configured to:
   convert a call from the first client apparatus using the address,
   transmit the converted call to the target device driver,
   receive a result relating to the transmitting from the target device driver,
   convert the received result, and
   transmit the converted result to the first client apparatus as the response.

3. The apparatus according to claim 2, wherein the processor is configured to:
   transmit, when the target device driver is not deployed, a value defined by the first information or an error as the response to the first client apparatus.

4. The apparatus according to claim 2, wherein the processor is configured to:
   determine, when the call for the target function is accepted from the first client apparatus, whether the target function is a function included in the second information, and
   continue, when it is determined that the target function is the function included in the second information, a process for the call for the target function.

5. The apparatus according to claim 1, wherein the processor is configured to:
   acquire the first information separately from the device driver or acquiring the first information through the device driver.

6. The apparatus according to claim 1, wherein the operation is a device scan to discover:
   a device existing in a surrounding area, setting of pairing, setting by a user, or a request from another apparatus as a trigger.

7. The apparatus according to claim 1, wherein the processor is configured to:
   register the second information into the first server referred to by the one or more client apparatuses or a second server configured to accept a call for the function of the device from the one or more client apparatuses, and
   register, when the second information is registered into the second server, a reference address acquiring the second information into the first server or informing the one or more client apparatuses of the reference address.

8. The apparatus according to claim 1, wherein the processor is configured to:
   perform, using that the device is no more discovered or that coupling to the device is cut as a trigger, deletion of the deployed device driver, deletion of the address and the path driver registered in an associated relationship with each other, ending of acceptance of a call for the function of the device, or deletion of the second information.

9. The apparatus according to claim 1, wherein the processor is configured to:
   acquire an application program assisting the function of the device,
   register a path to the application program in place of the path corresponding to the method to call the device driver, and
   associate the application program and the device driver with each other.

10. The apparatus according to claim 1, wherein the processor is configured to:
    update, when the device is no more discovered, another device is discovered and there is a difference in function between the device and the another device, the second information in response to the difference.

11. A method comprising:
    acquiring, by a processor when detecting a device by an operation, first information in which a function to be provided by the device is described and, a device driver corresponding to the device;
    deploying the acquired device driver so as to be operable;
    generating an address which is used to call the function of the device from one or more client apparatuses;
    registering the address and a path corresponding to a method to call the device driver in association with each other in correspondence information;

generating second information which is used when the one or more client apparatuses access the device and includes the first information and the address;

registering the second information in a first server;

acquiring, when a first client apparatus among the one or more client apparatuses acquires the second information corresponding to a target function which is desired by the first client apparatus by accessing the first server and accesses a target address of the second information corresponding to the target function, a target path corresponding to the target function from the correspondence information based on the target address;

calling a target device driver corresponding to the target function using the target path; and transmitting, after the target device driver accesses the target device, a response from the target device to the first client apparatus.

12. The method according to claim 11, further comprising:

converting a call from the first client apparatus using the address;

transmitting the converted call to the target device driver;

receiving a result relating to the transmitting from the target device driver;

converting the received result; and transmitting the converted result to the first client apparatus as the response.

13. The method according to claim 12, further comprising:

transmitting, when the target device driver is not deployed, a value defined by the first information or an error as the response to the first client apparatus.

14. The method according to claim 12, further comprising:

determining, when the call for the target function is accepted from the first client apparatus, whether the target function is a function included in the second information; and continuing, when the determining determines that the target function is the function included in the second information, a process for the call for the target function.

15. The method according to claim 11, further comprising:

acquiring the first information separately from the device driver or acquiring the first information through the device driver.

16. The method according to claim 11, wherein the operation is a device scan to discover a device existing in a surrounding area, setting of pairing, setting by a user, or a request from another apparatus as a trigger.

17. The method according to claim 11, further comprising:

registering the second information into the first server referred to by the one or more client apparatuses from the one or more client apparatuses; and registering, when the second information is registered into the second server, a reference address acquiring the second information into the first server or informing the one or more client apparatuses of the reference address.

18. The method according to claim 11, further comprising:

performing, using that the device is no more discovered or that coupling to the device is cut as a trigger, deletion of the deployed device driver, deletion of the address and the path registered in an associated relationship with each other, ending of acceptance of a call for the function of the device, or deletion of the second information.

19. The method according to claim 11, further comprising:

acquiring an application program assisting the function of the device;

registering a path to the application program in place of the path corresponding to the method to call the device driver; and associating the application program and the device driver with each other.

20. A non-transitory storage medium storing a program for causing a computer to execute a process, the process comprising:

acquiring, when detecting a device by an operation, first information in which a function to be provided by the device is described and a device driver corresponding to the device;

deploying the acquired device driver so as to be operable;

generating an address which is used to call the function of the device from one or more client apparatuses;

registering the address and a path corresponding to a method to call the device driver in association with each other in correspondence information;

generating second information which is used when the one or more client apparatuses access the device and includes the first information and the address;

registering the second information in a server;

acquiring, when a first client apparatus among the one or more client apparatuses acquires the second information corresponding to a target function which is desired by the first client apparatus by accessing the server and accesses a target address of the second information corresponding to the target function, a target path corresponding to the target function from the correspondence information based on the target address;

calling a target device driver corresponding to the target function using the target path; and transmitting, after the target device driver accesses the target device, a response from the target device to the first client apparatus.

* * * * *